2,821,506

PURIFICATION OF TITANIUM AND ZIRCONIUM METAL

Eugene Wainer, Cleveland Heights, Ohio, assignor, by mesne assignments, to Horizons Titanium Corporation, Princeton, N. J., a corporation of New Jersey No Drawing. Application August 19, 1954
Serial No. 451,063

5 Claims. (Cl. 204—64)

This invention relates to the purification of titanium, zirconium and their alloys. More specifically it relates to the removal from titanium or zirconium of elements such as oxygen or nitrogen or both oxygen and nitrogen which combine interstitially with the base metal to form contaminated metal. The metal may contain other impurities such as carbon, from which it is separated in the final purification treatment. With the growing commercial importance of titanium and zirconium, the need for utilizing the scrap produced in the normal processing of these metals, which is generally contaminated with oxygen, nitrogen or carbon, becomes increasingly urgent.

The metals to be purified may originate from a plurality of sources. The impurity content may be the result of inadvertent contamination during the preparation of the metal by a reduction process such as that described in Kroll Patent 2,205,854, or in the subsequent treatment of the metal so obtained, e. g., in the washing, or melting steps which are commonly practiced. Another and more significant source of contaminated metal is the scrap produced in the normal processing of raw stock. For example hot forging or hot rolling are accomplished under conditions at which titanium and zirconium avidly combine with oxygen and nitrogen. Still another source of contaminated scrap is the material produced when the metals are machined under oil or soap solutions. Most of the extraneous oil or soap solution could probably be removed by chemical washing techniques, but, at the point of machining, the temperature has usually reached a value sufficiently high that the metal has reacted with some of the constituents of the air, oil, or other material employed to facilitate machining.

It is well known that the presence of more than minute amounts of carbon, oxygen and nitrogen greatly increases the hardness of titanium and zirconium. Of these three impurities oxygen and nitrogen are the most serious and should not be present in an aggregate amount exceeding 0.2%. When oxygen and nitrogen are present in a combined total less than a few hundredths of one percent, then the carbon content may be as high as 0.3% without rendering the metal unduly hard for most purposes.

Hardness is one property commonly used to readily evaluate the quality of such metals as titanium and zirconium, since, as noted above, the hardness increases rapidly with the impurity content. If the Brinell hardness of these metals is in excess of 180, commercial processing such as cold rolling, cold forging and the like are difficult to accomplish on standard equipment. Material with a Brinell hardness in excess of 200 must be worked hot. When titanium base or zirconium base alloys are being processed the hardness values are even more important, since most of the alloying elements added are in themselves hardening agents. The increase in hardness produced by contamination with oxygen, nitrogen and carbon materially increases the energy required to effectively work the metal. The presence of these contaminants in excessive amounts may produce additional undesirable effects such as edge cracking, laminations and the like. The removal of these contaminants is rendered difficult because they are completely soluble in the form of certain compounds in both titanium and zirconium.

I have discovered that titanium and zirconium contaminated with oxygen, nitrogen and carbon may be converted into a relatively pure product which is soft and which may be processed in the same manner as virgin metal.

Briefly my process comprises a first step in which the contaminated metal is melted under carefully controlled conditions in the presence of at least 1.0% carbon to produce a billet containing a large carbon content and a diminished content of oxygen and nitrogen as compared to the original scrap material, followed by subsequent treatment in which the metal is ultimately recovered at the cathode in an electrolytic purification process.

Either of two melting procedures have been found to be suitable as follows: (1) The contaminated metal may be melted in an induction furnace under an actively pumping vacuum and excess carbon added to the melt or (2) the metal may be melted in an atmosphere of inert gas such as argon or helium at subatmospheric pressures, employing arc furnace techniques, the energy in the arc being controlled so that the argon atmosphere is removed gradually until the pressure developed results substantially from the gases being evolved from the melt. In either case a substantial amount of carbon is employed.

Usually between about 1 and 2% carbon has been found to suffice for the oxygen and nitrogen in the scrap. It has not been found necessary to remove substantially all of the oxygen and nitrogen, since the provision of a carbon content greater than the total oxygen and nitrogen content (atomic basis) is all that is required to carry out the subsequent separation and recovery of the purified titanium or zirconium. Thus materials with oxygen and nitrogen contents which have been only slightly diminished as a result of melting with carbon, may be satisfactorily adapted to processing as hereinafter described.

The carbon used in the melting step must be a pure form such as carbon black, calcined petroleum coke, or graphites made from such sources. While I do not wish to be bound by any particular theory as to what occurs during the melting step, some of the carbon appears to combine with the oxygen and nitrogen and thereby effect their removal, while additional carbon appears to replace them in the scrap on an atomic basis.

When scrap of irregular shape and unknown impurity content is being processed, it is sometimes difficult to be sure that a carbon addition of between 1 and 2% will suffice for my purpose. In such cases two procedures are available. In the first procedure the scrap is charged into a carbon container and melted under a vacuum in an induction furnace. The melt is maintained in a molten condition for several minutes to insure homogenization and is then cast into billet form in a carbon container. Then using a two electrode-type arc furnace, the billet is remelted as one electrode while the other electrode consists of pure graphite, so that effectively a drip melting technique is employed. Following this procedure, the carbon content of the finished product is in the range of 3 to 5% which is sufficient to provide for the contamination found in the usual scrap to be processed. As an alternative procedure, the contaminated metal may be melted in an induction furnace under a vacuum and carbon may then be added to the melt in an amount estimated to be sufficient. After casting, the billet obtained may be analyzed chemically to ascertain whether a second melting with a further addition of carbon is required. With either of the above procedures, billets are obtained which are substantially free from oxygen and nitrogen, or contain less than 0.2% total of these two ingredients, and at least 1% carbon. Carbon contents as high as 5% have not been found to cause any operating difficulty in the subsequent processing and it would appear that amounts of carbon sufficient to satisfy the formula TiC may be employed. The billets have a silvery white appearance, exhibit a brittle fracture and are of sufficient mechanical strength to permit considerable handling. A billet between 1 and 3 inches in diameter is admirably suited to the electroyltic purification which follows.

Any one of a number of procedures may be employed to recover pure titanium or zirconium from the billets obtained by the above melting procedure. For reasons of economy and simplicity, I prefer to obtain the titanium or zirconium as a deposit at the cathode in a fused salt electrolysis employing the billet as the anode and a nickel or iron rod as the cathode. Suitable electrolytes are described in copending application S. N. 358,194 filed May 28, 1953 by M. E. Sibert and J. T. Burwell, Jr. and may comprise one or more alkali metal halides employed alone or the said halides may be employed with the alkali metal double fluorides of titanium (or zirconium). Another alternative procedure is to use the titanium or zirconium billet containing an excess of carbon as a raw material from which an electrolytic bath may be prepared and extracting the titanium or zirconium therefrom as described in copending application S. N. 398,193 filed by J. T. Burwell, Jr. and Q. H. McKenna in which a fused salt bath is obtained by heating the carbide of titanium or zirconium in a fused salt bath containing an alkali metal halide or an alkaline earth metal halide or both in further admixture with 5 to 50% of an alkali metal fluotitanate. Upon heating, the bath components react and the transition metal carbide is converted to transition metal halide in solution in the fused bath. The resulting bath, upon electrolysis, yields the transition metal as a deposit at the cathode, and by continuously introducing the carbide containing material, continuously carrying out the thermal reaction and continuously electrolyzing, a product may be continuously obtained of the desired purity. As a further alternative the carbon-containing billet may constitute one of the raw materials for the electrolytic process described in my copending application S. N. 398,192 wherein a fused salt bath containing a transition metal chloride is obtained by chlorinating a transition metal carbide, which in this instance is the carbon containing billet, in a fused bath composed of alkali metal halides or alkaline earth metal halides with or without the alkali metal fluoride complex of the transition metal. Still further procedures for recovering the titanium or zirconium content of the carbon containing billet are described in an application Serial No. 451,061 filed August 19, 1954 by Q. H. McKenna which issued December 4, 1956 as U. S. Patent 2,772,946. In this modification the carbon containing billet is reacted with a double fluoride of potassium and titanium at temperatures between 800 and 1100° C. to produce complex potassium titanium fluorides in which the titanium is divalent or trivalent, from which the titanium is readily recovered by electrolysis in a fused salt bath. Other thermal means may be employed in conjunction with an electrolytic process or the carbon-containing billets may be used directly in the electrolytic process, but in any event the titanium or zirconium is ultimately recovered in the form of coarse crystals at the cathode and washed to remove any adherent residue from the fused bath. The metal is then melted to obtain a product free from such excessive amounts of oxygen, nitrogen and carbon as would render the metal too hard to properly fabricate.

The following specific examples are illustrative of the practice of the invention:

*Example 1*

A batch of contaminated titanium containing 0.28% oxygen, 0.18% nitrogen, and 0.12% carbon having a Brinell hardness of 218 was purified in the following manner. A charge of 1½ parts by weight of 100 mesh calcined petroleum coke was mixed thoroughly with 100 parts by weight of the impure titanium. The mixture was then placed in a graphite crucible and heated to red heat in an induction furnace under an actively pumping vacuum. The furnace was maintained at red heat until a vacuum of less than 100 microns was developed. At this stage the temperature is raised to approximately 2000° C. and maintained at this temperature for 15 minutes. The melt was then allowed to flow through a bottom pour plug in the graphite crucible into a graphite mold 2 inches in diameter, while still under a vacuum and the casting was allowed to cool under active pumping conditions. The billet so obtained analyzed 0.04% oxygen, 0.01% nitrogen and 0.93% carbon. The walls of the graphite crucible were eroded indicating that the charge had reacted with the crucible during the melting stage. The carbon content was lower than expected and it would appear that some of the carbon may have been oxidized by surface oxygen during the preheat stage.

The billet thus obtained was made the anode in a fused salt electrolysis with the cathode consisting of a nickel rod. The electrolyte consisted of 16 parts by weight of potassium titanium fluoride (potassium fluotitanate), and 84 parts by weight of sodium chloride. After suitable treatment i. e., a preliminary electrolysis to eliminate oxygen, nitrogen and water the electrolysis was conducted in a cell wherein the anode and cathode were spaced 3" apart, employing a voltage of 3.0 volts; the temperature of the fused bath was maintained at about 780° C. and the current density was 3.0 amperes per/square centimeter. Coarse crystals of titanium were deposited at the cathode. The deposit was cooled in an inert atmosphere, washed and purified to remove residual salts and remelted. The analysis of the final product was as follows: 0.08% oxygen, 0.02% nitrogen and 0.05% carbon and it had a Brinell hardness of 155, as compared with the initial hardness of 218.

*Example 2*

A titanium scrap containing 1.2% oxygen, 0.25% nitrogen and 0.21% carbon was to be purified. 100 parts by weight of this titanium scrap metal was melted in an induction furnace in the presence of 5 parts by weight of carbon, an amount considered to be sufficient to insure the replacement of substantially all of the oxygen and nitrogen in the scrap. The billet obtained which analyzed 0.05% oxygen, 0.02% nitrogen and 3.7% carbon was employed as the anode in a fused salt electrolysis as in Example 1. The cathode deposit, after remelting was cast into an ingot analyzing oxygen 0.06%, nitrogen 0.01% and carbon 0.07% having a Brinell hardness of 150.

*Example 3*

The same scrap material as described in Example 2 was broken into chunks of 1 inch of cross section or less. Instead of the induction furnace of Examples 1 and 2, an arc furnace operated in a vacuum enclosure was employed. The anode or hot electrode was a graphite rod. A water cooled copper crucible served as the other electrode. The furnace was evacuated cold to a pressure below 100 microns and then argon was bled into the furnace until a pressure of 200 microns was developed. The arc was then struck against the bottom of the crucible and carbon and contaminated titanium scrap were fed continuously from separate feeding ports into the melting zone. The amount of carbon metered into the mix was the same as in Example 2. Throughout the melting operation the graphite electrode was raised steadily so that it remained slightly above the pool of molten metal at all times. As the melting reaction proceeded, the argon atmosphere was reduced to 50 microns and the actual recorded furnace pressure fluctuated between 50 and 150 microns indicating that gases evolved from the melt were sufficient to increase the pressure over that due to the argon. After cooling and examination of the various parts, a substantial consumption of the graphite electrode was noted. The billet contained 0.03% oxygen, 0.01% nitrogen, 4.8% carbon. After electrolytic purification as above described, the impurity content was 0.05% oxygen, 0.02% nitrogen and 0.08% carbon. The product had a Brinell hardness of 162.

*Example 4*

The melting procedure of Example 1 was repeated using a zirconium scrap having a Brinell hardness in excess of 250, containing 0.53% oxygen, 0.12% nitrogen and 0.20% carbon. Three parts by weight of calcined petroleum coke (−100 mesh, Tyler Standard) were employed for each 100 parts by weight of metal. The casting obtained in a graphite container analyzed 0.04% oxygen, 0.01% nitrogen and 2.8% carbon. After electrolytic purification in a bath in which the electrolyte consisted of 15% potassium zirconium fluoride (potassium fluozirconate) and 85% sodium chloride, the cathode product was washed and melted. The metal obtained had a Brinell hardness of 148 and contained 0.04% oxygen, 0.02% nitrogen and 0.10% carbon.

I claim:

1. A method of purifying an impure metal from the group consisting of titanium and zirconium contaminated with a substantial amount of at least one impurity from the group consisting of oxygen and nitrogen which comprises diminishing the amount by incorporating at least 1% carbon into the metal while the metal is in a molten state by mixing the contaminated metal with carbon, heating the mixture to melt the metal and maintaining the molten metal and carbon in contact with one another until the metal contains at least 1% by weight of carbon, casting the resulting melt into a billet, introducing the billet into a fused salt electrolyte, passing an electrolyzing current through said electrolyte and said billet in an electric circuit in which said billet is anodic, and recovering the metal content of the carbon-containing billet freed from said impurities in the form of cathode-deposited metal resulting from fused salt bath electrolysis.

2. A method of removing interstitial impurities from a metal of the group consisting of titanium and zirconium which comprises melting the impure metal admixed with carbon in an inert atmosphere under reduced pressure, thereby adding at least 1% carbon to the melt while diminishing the amount of interstitial impurity other than carbon in the metal, casting the carbon containing melt into the form of a carbon containing billet, providing a fused salt electrolyte consisting essentially of at least one halide salt of the group consisting of alkali metal halides and alkaline earth metal halides, introducing the billet into said electrolyte, passing an electrolyzing current through said billet and said electrolyte and recovering the metal content of the carbon containing billet as pure metal substantially free from said interstitial impurities in the form of cathode deposited metal.

3. The process of claim 2 in which the billet is reacted with a double fluoride of potassium and titanium and the lower valent potassium titanium fluoride obtained is electrolyzed as a fused salt bath to produce a pure metal at the cathode.

4. A process for recovering metal of the group consisting of titanium and zirconium from scrap contaminated with oxygen, nitrogen and carbon which comprises melting the impure metal in an induction furnace in contact with carbon in an amount sufficient to provide at least 1% carbon in the resulting melt, casting the carbon containing metal into the form of a rod, drip melting the carbon containing rod in an arc furnace onto a graphite electrode whereby a product containing 3 to 5% carbon and insignificant amounts of nitrogen and oxygen is obtained, and electrolytically recovering the metal content from the carbon containing product in the form of cathode deposited metal substantially free from oxygen, nitrogen and carbon.

5. Method of claim 4 in which the initial scrap has a Brinell hardness in excess of 200 and the cathode deposited metal has a Brinell hardness less than 180.

References Cited in the file of this patent

UNITED STATES PATENTS

| 2,734,244 | Herres | Feb. 14, 1956 |
| 2,734,856 | Schultz et al. | Feb. 14, 1956 |

FOREIGN PATENTS

| 1,064,893 | France | Dec. 30, 1953 |

OTHER REFERENCES

"Metal Progress," Aug. 1950, pages 185–188, article by Bounds et al.